(12) United States Patent
Chiriac et al.

(10) Patent No.: US 6,418,016 B1
(45) Date of Patent: Jul. 9, 2002

(54) SYSTEM AND METHOD FOR COOLING USING AN OSCILLATORY IMPINGING JET

(75) Inventors: Victor A. Chiriac, Chandler; Tien-Yu Tom Lee, Phoenix, both of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/765,182

(22) Filed: Jan. 18, 2001

(51) Int. Cl.[7] ................................................. H05K 7/20
(52) U.S. Cl. ........................ 361/695; 34/488; 165/908; 361/719; 454/285
(58) Field of Search ..................... 165/80.3, DIG. 11, 165/908, 121–126; 257/712, 713, 723, 724; 361/690–695, 717–719; 62/414, 418, 259.2; 174/15.1, 16.1; 454/184, 285; 34/229, 488; 29/890.035, 832

(56) References Cited

U.S. PATENT DOCUMENTS

| | | | | |
|---|---|---|---|---|
| 4,151,955 A | * | 5/1979 | Stouffer | 239/11 |
| 4,498,118 A | * | 2/1985 | Bell | 361/694 |
| 5,548,907 A | * | 8/1996 | Gourdine | 34/448 |
| 5,943,211 A | * | 8/1999 | Havey et al. | 361/699 |
| 6,134,108 A | * | 10/2000 | Patel et al. | 361/695 |
| 6,276,440 B1 | * | 8/2001 | Kaga et al. | 165/96 |

* cited by examiner

*Primary Examiner*—Gerald Tolin
(74) *Attorney, Agent, or Firm*—Robert F. Hightower; Mark J. Fink

(57) ABSTRACT

A system and method for cooling are disclosed. The system for cooling includes an opening out of which a jet of coolant can flow, a target element, and a forcing device which causes the jet of coolant to flow out of the opening. The target element is positioned in front of the opening so that the jet of coolant, when flowing out of the opening, is directed toward the target element. The jet of coolant oscillates so that the jet of coolant sweeps across the target element and cools a variety of different locations along the target element.

19 Claims, 10 Drawing Sheets

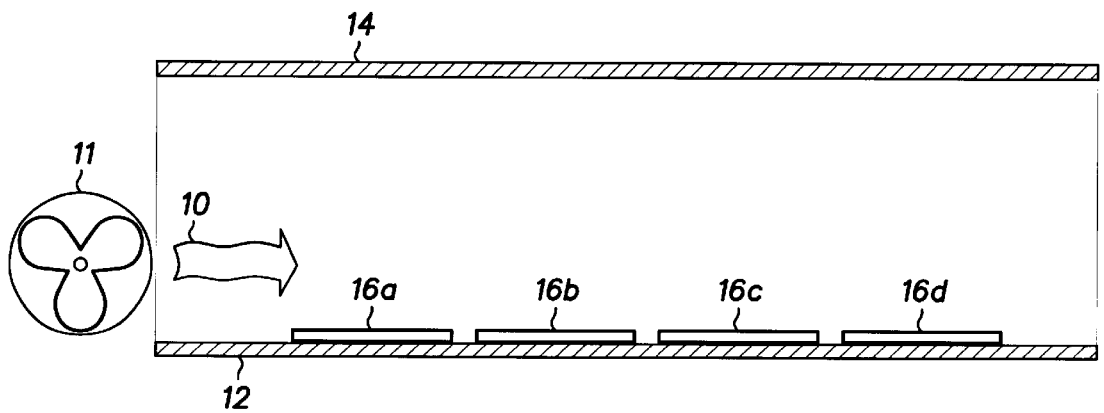
*- PRIOR ART -* FIG. 1
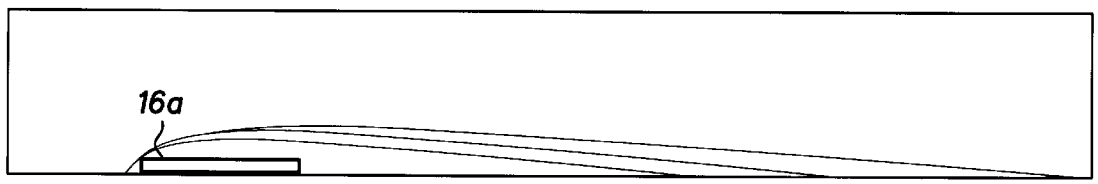
*- PRIOR ART -* FIG. 2
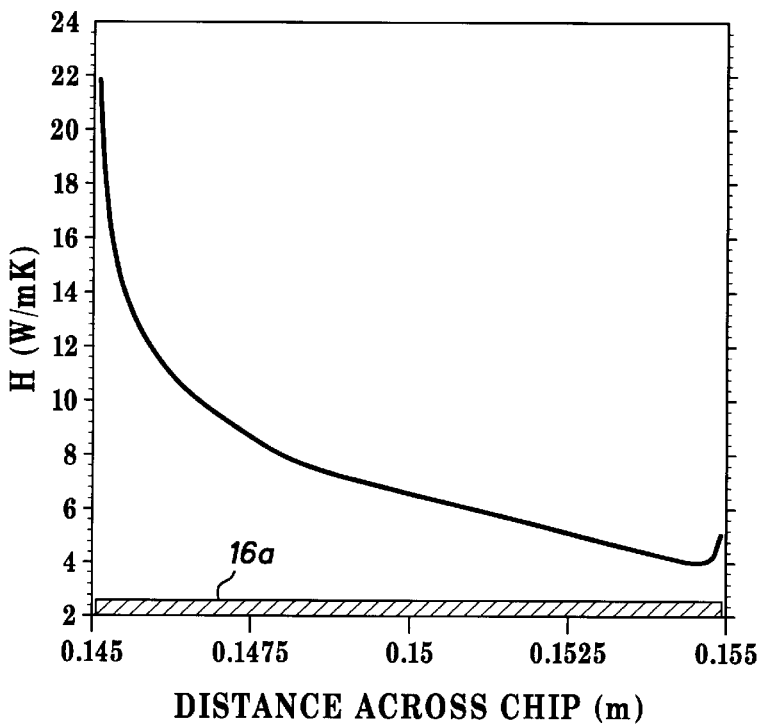
FIG. 3
*- PRIOR ART -*

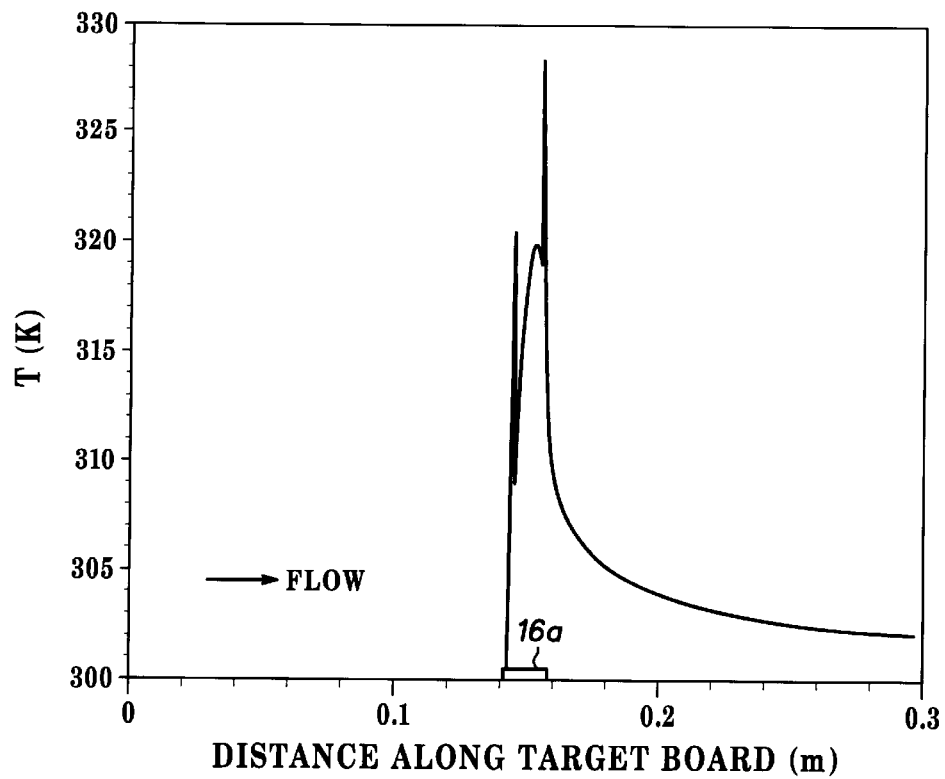
- *PRIOR ART* -   *FIG. 4*
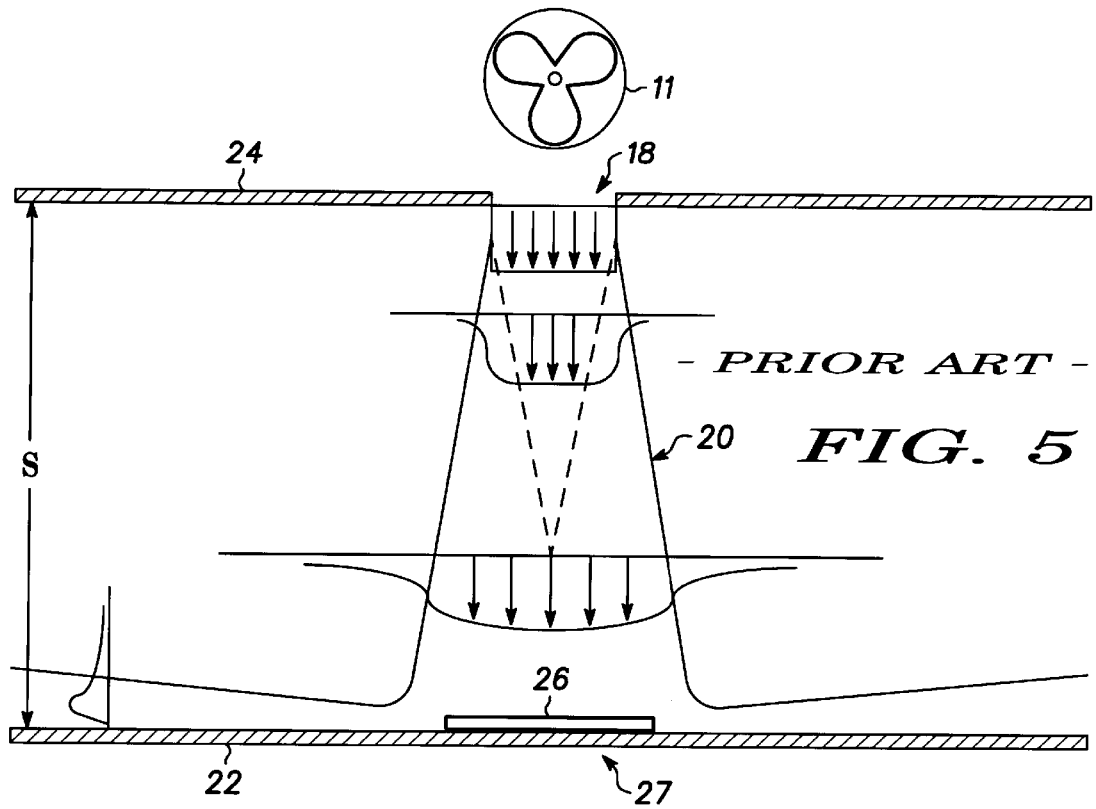
- *PRIOR ART* -   *FIG. 5*

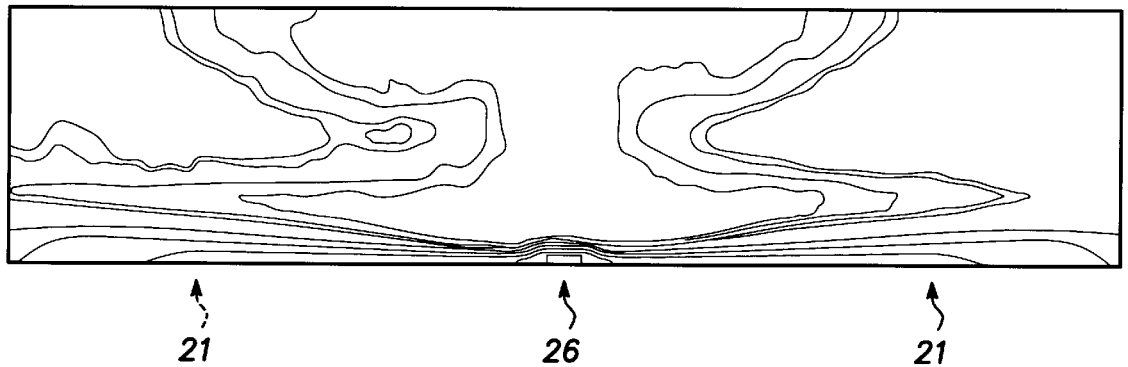
*- PRIOR ART -* FIG. 6
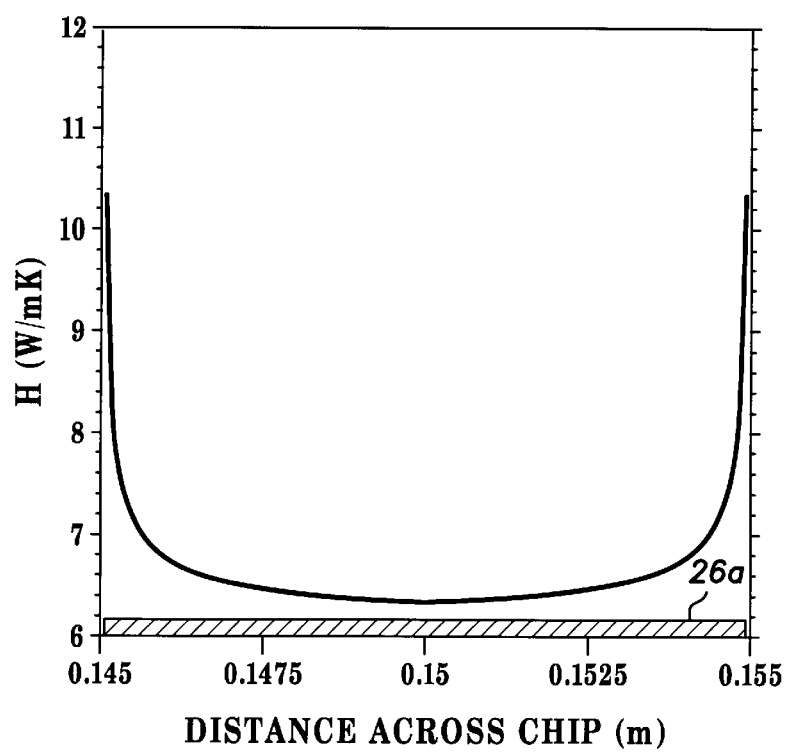
*- PRIOR ART -* FIG. 7

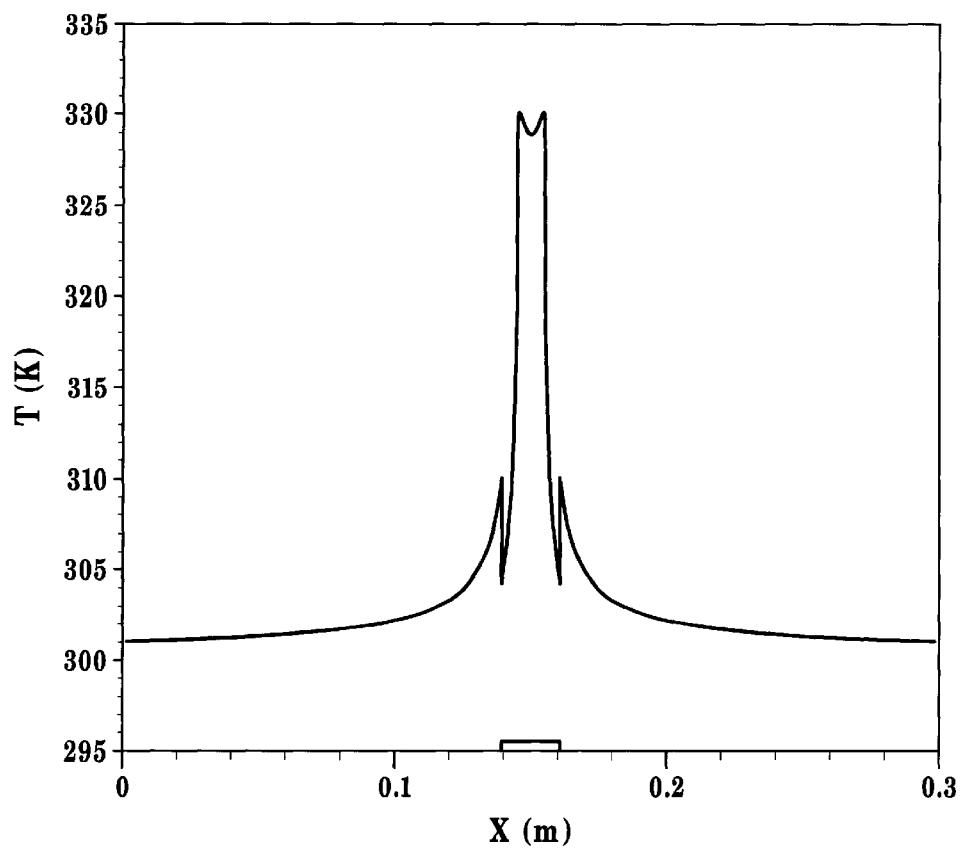
FIG. 8 - PRIOR ART -
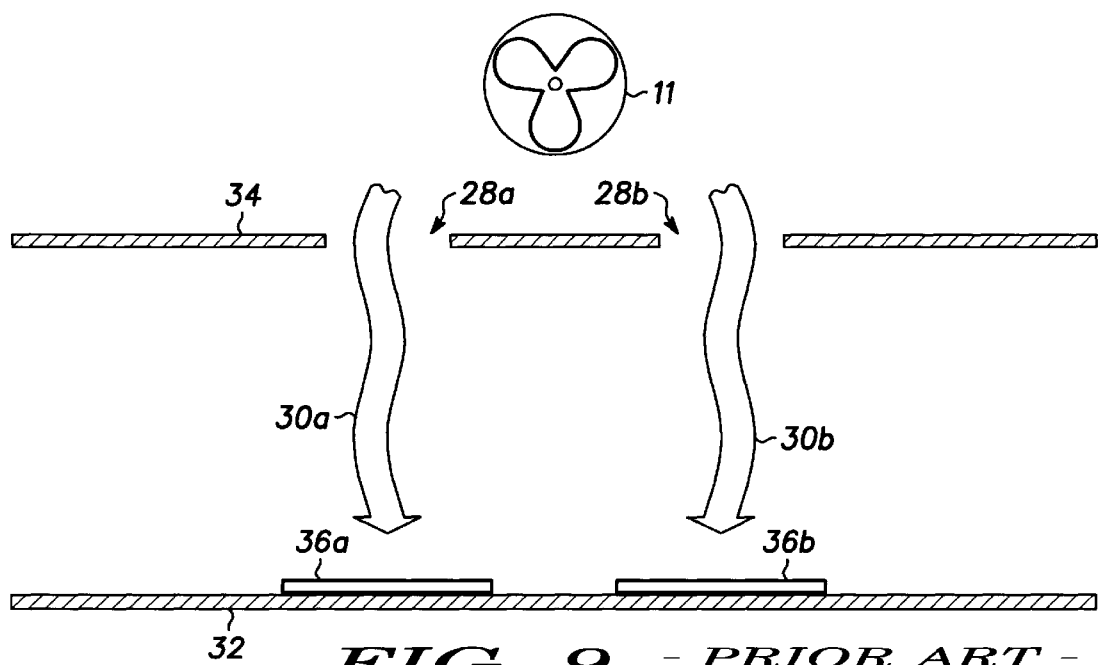
FIG. 9 - PRIOR ART -

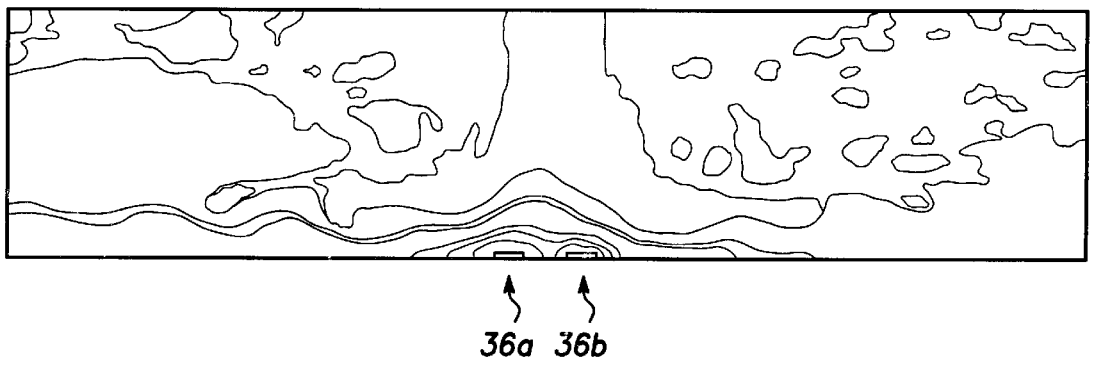
36a 36b
- *PRIOR ART* -  *FIG. 10*
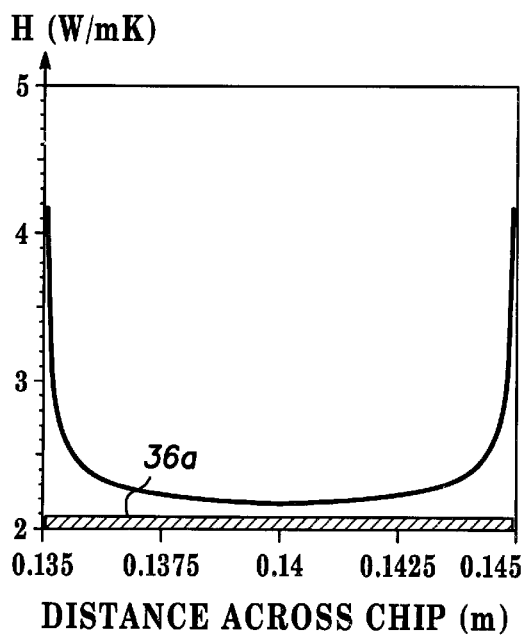
- *PRIOR ART* -
*FIG. 11A*
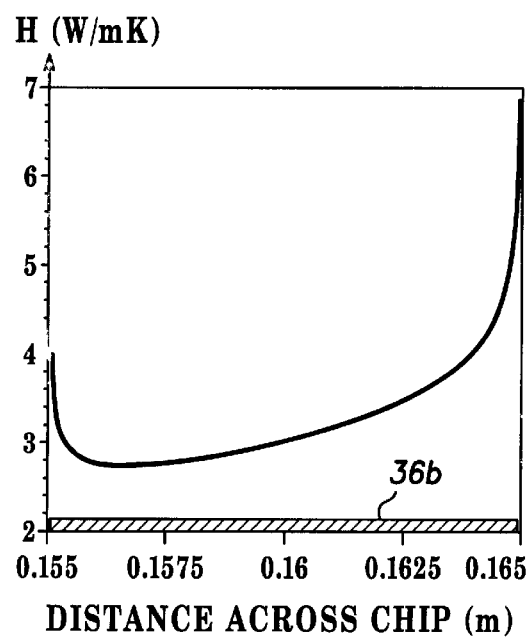
- *PRIOR ART* -
*FIG. 11B*

*- PRIOR ART -*

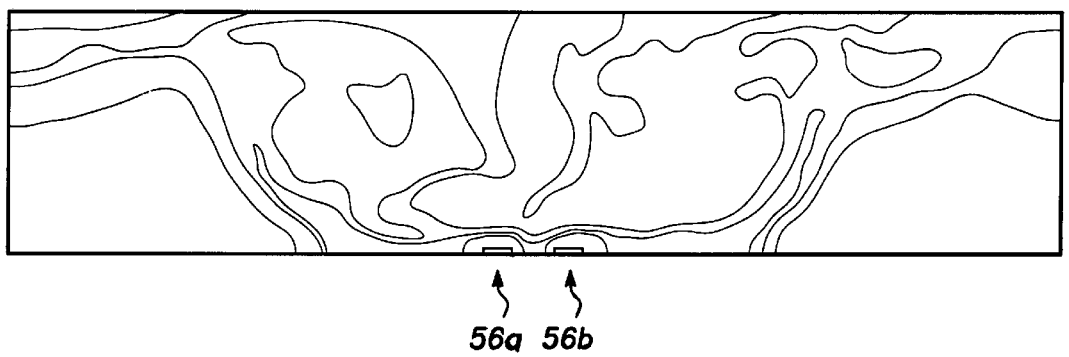
FIG. 18
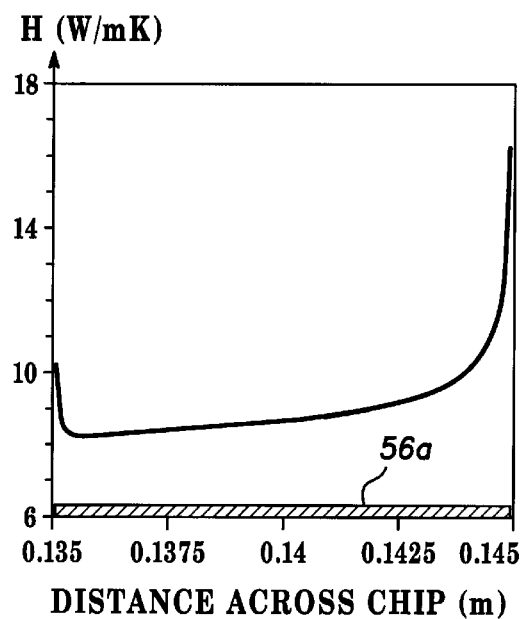 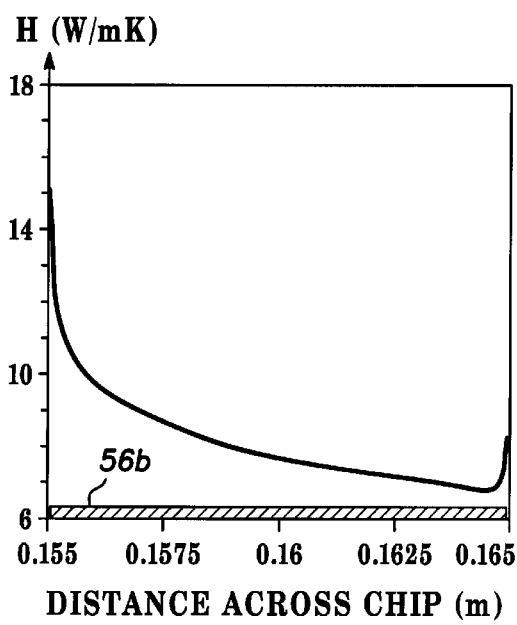
FIG. 19A  FIG. 19B

SYSTEM AND METHOD FOR COOLING USING AN OSCILLATORY IMPINGING JET

FIELD OF THE INVENTION

The present invention relates generally to electrical equipment, and in particular relates to systems and methods for cooling.

BACKGROUND OF THE INVENTION

Maintaining electrical devices and equipment within specified temperatures is often an important requirement for maintaining the operability of those devices. In the field of microelectronics, for example, microchips such as microprocessors must be maintained at or below maximum temperatures during operation to prevent the self-destruction of the microchips. Accompanying recent and continuing increases in the processing power and operating speeds of microchips led to increases in the power dissipation of those microchips. For example, new high-powered chips can dissipate at least 10 Watts of power per chip and have heat fluxes as high as 200 W/cm$^2$. Consequently, the cooling of microchips during their operation is becoming even more critical as the performance of those microchips becomes even greater.

Numerous techniques for cooling currently exist. With respect to the cooling of microchips in particular, many existing cooling techniques incorporate large and costly heat spreaders and heat sinks, which impose limits on package size and functionality. Other techniques involve directing one or more jets or streams of cool air or other gas (or liquid) at or along the one or more microchips that require cooling. Referring to FIGS. 1–4 (Prior Art), one conventional solution for microelectronics cooling is a channel-flow system, in which a cool air jet 10 is directed between two circuit boards 12, 14 across the one or more microchip devices 16 that require cooling. The cool air jet 10 is generated by way of a conventional blower, fan or other standard pumping device 11. Although simple to implement, the channel-flow system is limited in that it requires large pumping powers to provide effective cooling (e.g., $P_{pump}$=0.0348 kg/s).

Further, as air flow passes along the circuit board 12, heat energy removed from upstream microchip devices raises coolant temperature such that downstream devices are not exposed to as low of a coolant temperature. As a result, downstream devices do not receive appropriate cooling, and they can rapidly reach prohibitive temperatures that may lead to failure and/or damage. As shown in FIG. 2, which shows increasing heat intensities as increasingly light shades of gray, the temperature of the air coolant is increased as it passes by and absorbs heat from device 16a, for example. Consequently, the cooling experienced by any downstream devices such as devices 16b–16d is considerably lessened. Further, because the air flowing along each device 16 (such as device 16a) picks up heat energy as it passes along the respective device, the heat transfer coefficient experienced by each respective device along its top face decreases significantly along the surface of the device as one progresses in the direction of air flow (see FIG. 3). Consequently, the time-averaged temperature along the surface of the device increases significantly as one moves along the device in the direction of air flow (see FIG. 4). Additionally, in cases where not all of the microchip devices 16 require the same amount of cooling, the channel-flow system wastes air and pumping power on devices that do not require cooling. Consequently, the channel-flow system has a limited efficiency as a system for cooling microchips.

Turning to FIGS. 5–8 (Prior Art), a second conventional system for microelectronics cooling involves directing a steady impinging jet of air 20 (generated by way of pumping device 11 as shown in FIG. 5) from a rectangular slot 18 in a top circuit board 24 down toward a bottom circuit board 22 on which one or more microchip devices 26 are situated. Typically, a jet is characterized as a unidirectional fluid flow, that is unconstrained so that the width or diameter of the fluid flow increases along the direction of flow. A jet has a central tip at the middle of a cross-section of the jet at a point where that middle point of that cross-section intersects an object in the path of the jet. A central core of the jet is a central portion of the jet along the direction of flow where the laminar flow occurs. At a central tip of the jet 20, which impinges the surface of the single microchip device 26 that is supported by the bottom circuit board 22, is a stagnation point 27. This is the point of the jet at which the greatest pressure of coolant is applied, and is characterized by the highest heat transfer coefficient (thus highest heat removal capacity). The steady impinging jet system is a better cooling solution than the channel-flow system, because similar time-averaged heat transfer coefficients and temperatures can be obtained along the top surfaces of the microchip devices 26 with a pumping power that is about 6.5 times lower than for the channel-flow system (e.g., $P_{pump}$=0.00548 kg/s vs. 0.0348 kg/s), and with lower velocity air flows (compare FIGS. 7 and 8, respectively, with FIGS. 3 and 4). Further, the steady impinging jet system is better than the channel-flow system also because the cooling of the microchip devices 26 occurs in a more uniform manner along the top faces of the microchip devices (see FIGS. 7 and 8).

Nevertheless, the steady impinging jet system also is limited in its effectiveness for cooling microchips. As shown in FIG. 6, the heat removed from the microchip device 26 undergoing cooling is confined to a region above the bottom circuit board. This region is identified as the thermal boundary layer developing along the top surface of the device and board, that is, where the distance between the top of the device/board and the dark region above it is thin. Although cooling occurs efficiently where this boundary layer is thin, efficient cooling does not occur where this boundary layer becomes thicker, as it does on either side of the microchip device 26. Consequently the temperatures along the circuit board 22 on either side of the central microchip device 26 are not reduced as much by the operation of jet 20, and other microchip devices placed downstream on either side of the central microchip device may as a result be exposed to excessive temperatures. This is the case, for example, at points 21 in FIG. 6.

Referring to FIGS. 9–12, a third conventional system for cooling microchip devices 36 involves directing two steady impinging jets 30a,30b parallel to one another from respective rectangular slots 28a,28b towards respective microchip devices 36a,36b. Each of the rectangular slots 28a,28b has a width of 1 centimeter (half that of rectangular slot 18) and each jet 30a,30b has a pumping power that is approximately half that of jet 20, so that the combined effect of the steady impinging jets is similar to that of jet 20 with respect to FIGS. 5–8. Using multiple jets 30 is advantageous relative to the single steady impinging jet system of FIGS. 5–8 because the heat transfer coefficient is maintained at a more uniform level over a wider region, over two (or more) devices 36 (see FIG. 11). Likewise, the temperature along the top surface of the microchip devices 36 and the circuit board 32 supporting those devices is reduced over a larger area as shown by FIGS. 10 and 12.

However, the multiple jet system is less efficient than the single steady impinging jet system in terms of the amount of cooling that occurs given the same amount of total air flow and power for generating air flow. The multiple jet system additionally suffers from possible increases in temperature, especially at locations in between the individual jets due to the interaction of the jets. Because of the interaction between the jets, there is a slight shift in the flow, as well as to a recirculation region (with hot air) between the two devices, which reduces the heat transfer coefficient and hence provides poor cooling at device edges. Further, the multiple jet system suffers from the same problem as the single jet system insofar as efficient cooling only occurs where there is a thin thermal boundary layer. Since heat is confined to a thin thermal layer, downstream components would be negatively impacted, similar to the examples of the second system previously discussed.

While each of the three conventional systems for cooling microchips shown in FIGS. 1–12 have relative advantages and disadvantages, the systems require large pumping powers to generate the air flow required to cool the microchip devices. Further, each of the systems has one or more limitations in terms of the uniformity of the cooling that occurs along the region that is desired to be cooled. Consequently, there remains a need for a system and method for more effectively cooling microchips as well as other devices generally. In particular, there remains a need for a system and method for cooling which is more efficient at cooling than conventional systems and at the same time provides a more uniform cooling effect than conventional systems.

BRIEF DESCRIPTION OF THE DRAWINGS

FIG. 1 is a cross-sectional view of a prior-art channel-flow system for cooling microchip devices;

FIG. 2 is a grayscale representation of temperature variations in the cross-sectional view of the prior-art channel-flow system of FIG. 1 cooling a single microchip device;

FIG. 3 is a graph of the variation in the time-averaged heat transfer coefficient existing along a top face of the single microchip device of FIG. 2 when it is cooled using the prior-art channel-flow system;

FIG. 4 is a graph of the variation of the time-averaged temperature of the system containing the single microchip device of FIG. 2 when it is cooled using the prior-art channel-flow system;

FIG. 5 is a cross-sectional view of a prior-art steady impinging jet system for cooling microchip devices;

FIG. 6 is a grayscale representation of temperature variations in the cross-sectional view of the prior-art steady impinging jet system of FIG. 5 cooling a microchip device;

FIG. 7 is a graph of the variation in the time-averaged heat transfer coefficient existing along a top face of the microchip device of FIG. 6 when it is cooled using the prior-art steady impinging jet system;

FIG. 8 is a graph of the variation of the time-averaged temperature in the system containing the microchip device of FIG. 6 when it is cooled using the prior-art steady impinging jet system;

FIG. 9 is a cross-sectional view of a prior-art multiple (dual) steady impinging jet system for cooling microchip devices;

FIG. 10 is a grayscale representation of temperature variations in the cross-sectional view of the prior-art multiple jet system of FIG. 9 cooling two microchip devices;

FIG. 11 is a pair of graphs of the variation in the time-averaged heat transfer coefficients existing along the top faces of the two microchip devices of FIG. 10 when the devices are cooled using the prior-art multiple jet system;

FIG. 18 is a grayscale representation of the temperature variations in the cross-sectional view of the new unsteady impinging jet system of FIG. 13 cooling two microchip devices in accordance with the present invention;

FIG. 19 is a pair of graphs of the variation in the time-averaged heat transfer coefficients existing along the top faces of the two microchip devices of FIG. 18 when the devices are cooled using the new unsteady impinging jet system in accordance with the present invention;

DETAILED DESCRIPTION OF THE DRAWINGS

Figure 12:
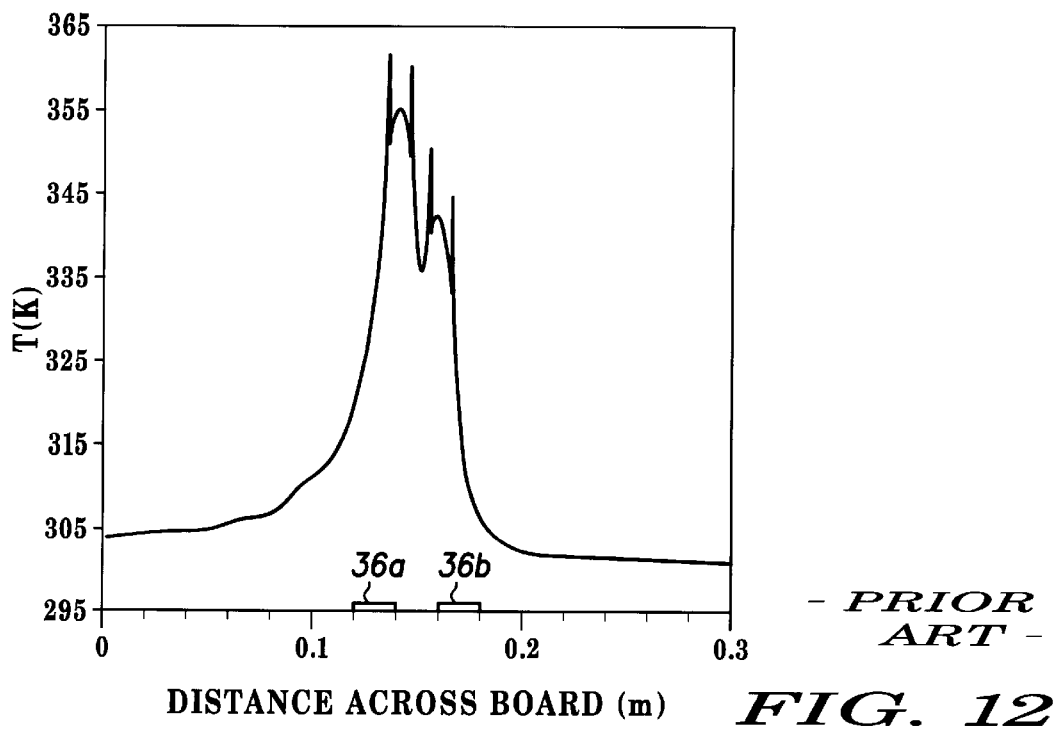
FIG. 12 is a graph of the variation of the time-averaged temperature across the circuit board of FIG. 10 (and the portion of the circuit board on which the microchip devices are mounted that is in between the two microchip devices) during cooling by way of the prior-art multiple jet system.

FIGS. 13–17 illustrate a new system for cooling that employs an unsteady impinging jet. The new unsteady impinging jet system is applicable to a variety of cooling applications including microchips, power supplies, motors, and other heat generating devices. The new unsteady jet system shown in FIG. 13 includes a jet of fluid or coolant 40 that is generated by a conventional pumping device 11 such as a fan or blower that moves the fluid and forces it out of an opening 38 in baffle 44 such as a circuit board containing components on a metal plate. Jet 40 is directed towards a target 42, for example a circuit board, that supports a variety of heat generating elements illustrated by a single target element such as a microchip device 46 to be cooled. Jet 40 is generally directed toward target 42 along a first axis 45. The combined assembly of target 42 and microchip device 46, or simply microchip device 46, can be considered the target of the jet 40. In one embodiment, target 42 is adiabatic (not allowing heat into the board).

Figure 13:
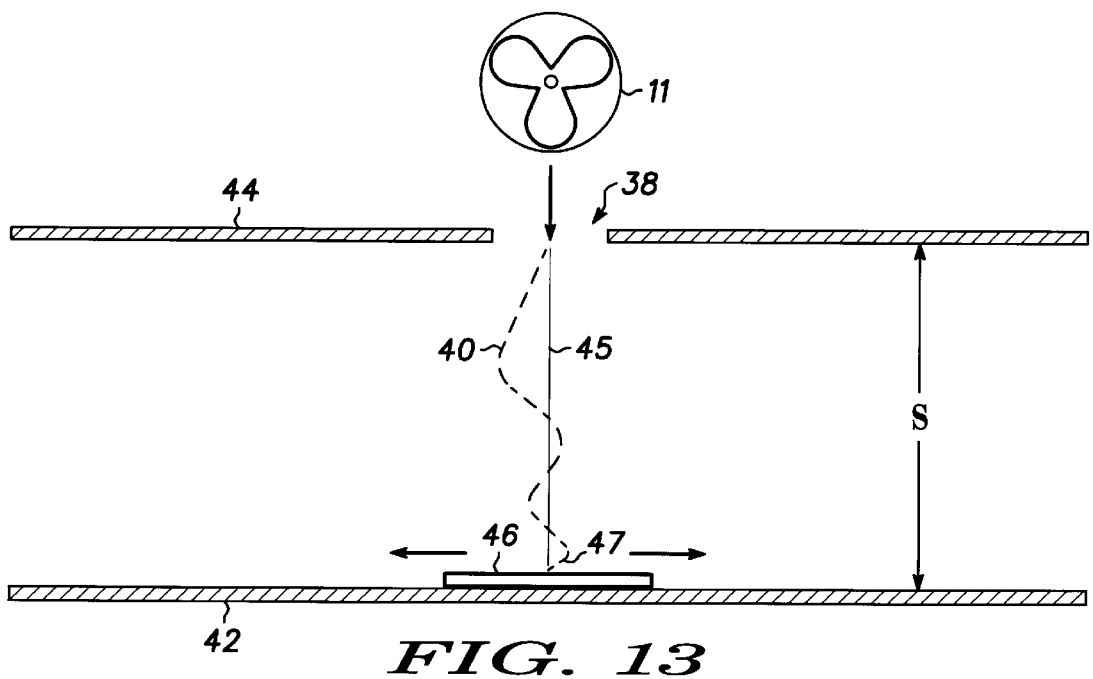
FIG. 13 illustrates a cross-sectional view of a new unsteady laminar impinging jet system for cooling microchip devices in accordance with one embodiment of the present invention.

In contrast to the jet 20 of the prior art, steady jet system of FIG. 5, which flows in a steady laminar symmetric manner, the jet 40 of the new unsteady impinging jet system of FIG. 13 flows in an unsteady laminar manner. Specifically, the jet 40 loses the symmetry and "buckles" or oscillates back and forth about the first axis 45 so that the central core is not always parallel to axis 45. The oscillation occurs in part due to the existence of vortices (areas of high recirculation) near the opening 38 which distort the jet core, entrain or remove some of the cool air from the incoming jet air exiting opening 38, and eliminate warm air at the channel top where air exits the channel. Due to the oscillation, the jet 40 varies in its position with respect to the first axis 45 as one progresses along the first axis. Further with respect to the central tip of the jet 40 along the target 42, an additional phenomenon related to the buckling occurs in which the central tip of the jet 40 "sweeps" or moves back and forth along the target 42.

Figure 14:
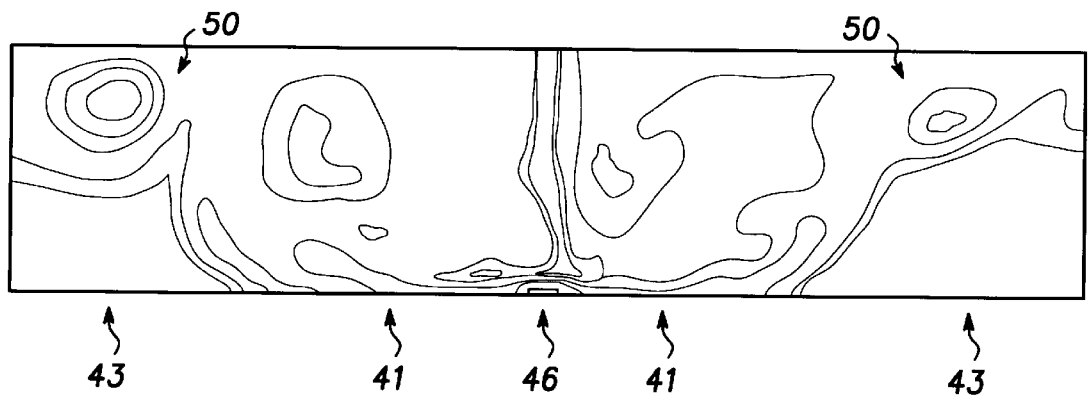
FIG. 14 illustrates a grayscale representation of temperature variations in the cross-sectional view of the new unsteady impinging jet system of FIG. 13 cooling a single microchip device according to the present invention.
Figure 15:
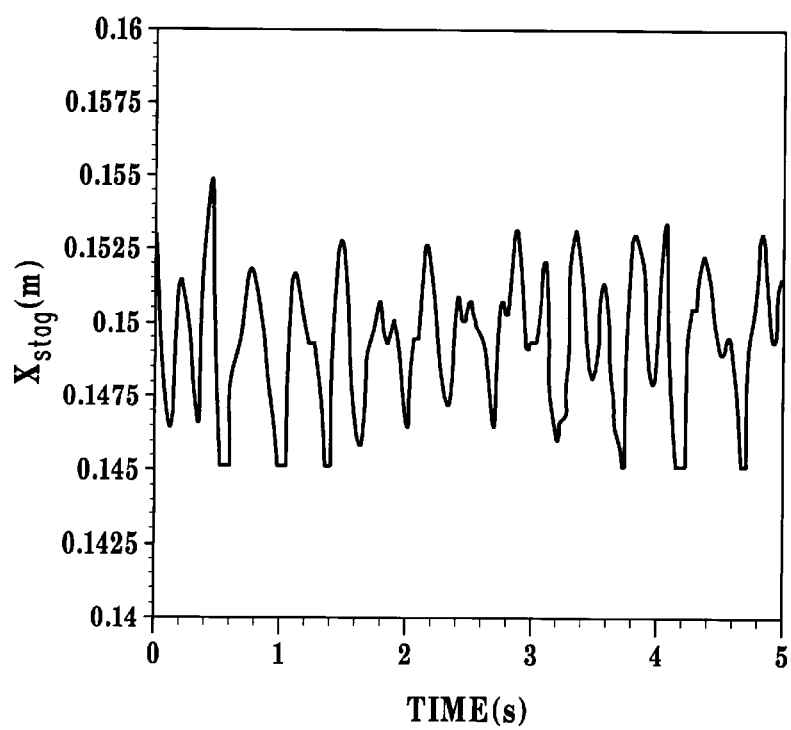
FIG. 15 is a graph representing the positional variation over time of a tip of the jet of the new unsteady impinging jet system of FIG. 14, as it oscillates or sweeps with respect to the single microchip device according to the present invention.

As in the case of the prior art steady jet system, the central tip or tip of the jet 40 along the target 42 is a stagnation point 47. The stagnation point 47 is the point at which greatest pressure of the jet 40 is provided against the target 42, and consequently the greatest amount of cooling and maximum heat transfer coefficients occur. As a result of the sweeping motion of the tip of jet 40 across target 42, the position of the stagnation point 47 moves back and forth relative to the target 42 such that the portion of the target 42 receiving the greatest amount of cooling varies in time. For example, FIG. 14 (which shows increasing heat intensities as increasingly light shades of gray) shows one instant of operation of the new system at which the jet 40 has moved toward the right end of the microchip device 46. An exemplary plot of the positional variation over time of the tip of the jet 40 during operation of the present embodiment is shown in FIG. 15.

The unsteady laminar flow of the jet 40 of the new unsteady impinging jet system only occurs under certain restricted conditions. This is because the unsteady laminar mode of flow of the jet 40 is only a transitional mode of operation between the two normal modes of flow, namely the steady laminar mode and the turbulent mode. Specifically, the unsteady laminar mode of flow only occurs for jets that are directed over certain limited distances and that have certain Reynolds number ("Re") values. Re, which is well known in the art, is defined as equaling the product of the double width/hydraulic diameter (D), velocity (v) and density of the gas/liquid ($\rho$) of the jet, divided by the viscosity ($\mu$) of the gas/liquid. In the embodiment illustrated in FIG. 13, which is particularly suited for cooling microchip devices, the distance or spacing S between the opening 38 and the target 42 is 6 centimeters, and the Re value is 600. To obtain the Re value of 600, the jet velocity v is 0.475 m/s, the hydraulic diameter D is 2 centimeters (equaling twice the jet width), the density $\rho$ is about 1.16 kg/m$^3$ (at about 27 degrees Celsius), and the viscosity $\mu$ of air is about 185 N sec/m$^2$. In general, the unsteady impinging jet system can be achieved for other spacings and Reynolds numbers by maintaining a linear relationship between S and Re when either deviates from the numbers of this example. More generally, Re/S$\infty$100 m$^{-1}$.

To obtain a hydraulic diameter D of 2 centimeters, the opening 38 is a rectangular slot having a width of 1 centimeter. The jet 40 expands as it travels towards the target 42. Additionally, the lengths of the baffle 44 and target 42 are significantly larger than that of the slot, for example, 10 centimeters, 30 centimeters or more. A rectangular slot is employed as the opening 38 so that the two types of oscillations (buckling and sweeping) occurring in the jet 40 occur within a single dimension, that is, so that the buckling and sweeping of the jet occur within or parallel to a plane formed by the first axis 45 and the long axis (generally the axis of the longest side) (width) of the rectangular slot. In alternate embodiments in which the opening 38 has a shape other than the rectangular slot, the oscillations of the jet 40 can occur in more than one dimension in a more complicated manner. Further in alternate embodiments, the opening 38 can be formed by a nozzle or other element rather than merely a slot within the baffle 44. The pumping power employed to create the jet 40 is identical to that discussed above with respect to the conventional steady jet system shown in FIG. 5 ($P_{pump}$=0.005481 kg/s), which will facilitate a direct comparison of the two systems that is provided below.

The buckling of the jet 40 and the sweeping of the tip of the jet 40 back and forth across the target 42 need not occur, and typically do not occur, at the same frequency. Given the spacing S, Re value and other characteristics described above concerning the present embodiment, the frequency of the buckling (oscillation frequency) of the jet 40 is 12.96 Hz and the sweeping frequency is 3.66 Hz. The oscillation frequency is associated with the primary motion of the jet, induced by the high recirculation (vortices) that are moving on both sides of the jet, while the sweeping frequency is associated with the flapping motion of the tip of jet 40 on the target 42.

In alternate embodiments of the new system, the spacing S, the Re value and the component factors of the Re value including the shape and size of the opening 38, the velocity of the gas/liquid and the type of gas/liquid can be varied as long as the linear relationship between S and Re is maintained. For example, in further embodiments used to cool microchip devices, the jet 40 will still oscillate when the spacing S is varied between 5 and 7 centimeters, or the Re value is varied between approximately 570 and 630. Further, oscillation of the jet 40 also can occur for other spacing S between the opening 38 and the target 42 if the Re value is correspondingly varied. Typically, a change in the Re value must be accompanied by a linear increase in the spacing S to maintain the appropriate relationship for unsteady laminar flow.

Although a variety of combinations are possible, the various dimensions of system elements, Re value and coolant that are chosen must be set so that the jet 40 is operating in the unsteady laminar mode between the steady laminar mode and the turbulent mode. It is typically desirable to maintain the spacing S at a value of 5–7 centimeters because at lower values the range of Re values within which the jet 40 will still oscillate becomes narrowed, such that it is difficult to maintain operation of the system within the unsteady laminar mode. From a qualitative perspective, it is desirable to maintain the spacing S within the 5–7 centimeter range because, below 5 centimeters, there may be insufficient space within which the buckling of the jet 40 can occur and, above 7 centimeters, the jet 40 may fail to retain sufficient momentum to allow the oscillation to occur. In either case (below 5 centimeters or above 7 centimeters), the jet may not oscillate. Also, 5–7 centimeters is a typical distance between motherboards in a typical printed circuit board rack.

The new unsteady impinging jet system surpasses the conventional systems discussed with reference to FIGS. 1–12 in terms of its efficiency in cooling and the uniformity with which it cools. The example used to illustrate the new system can be directly compared with the conventional systems of FIGS. 5–12 because both systems utilize the same amount of pumping power. The example used to illustrate the new system can also be indirectly compared with the channel-flow system of FIGS. 1–4 if one accounts for the fact that the channel-flow system shown uses 6.5 times more pumping power than the new system.

Figure 16:
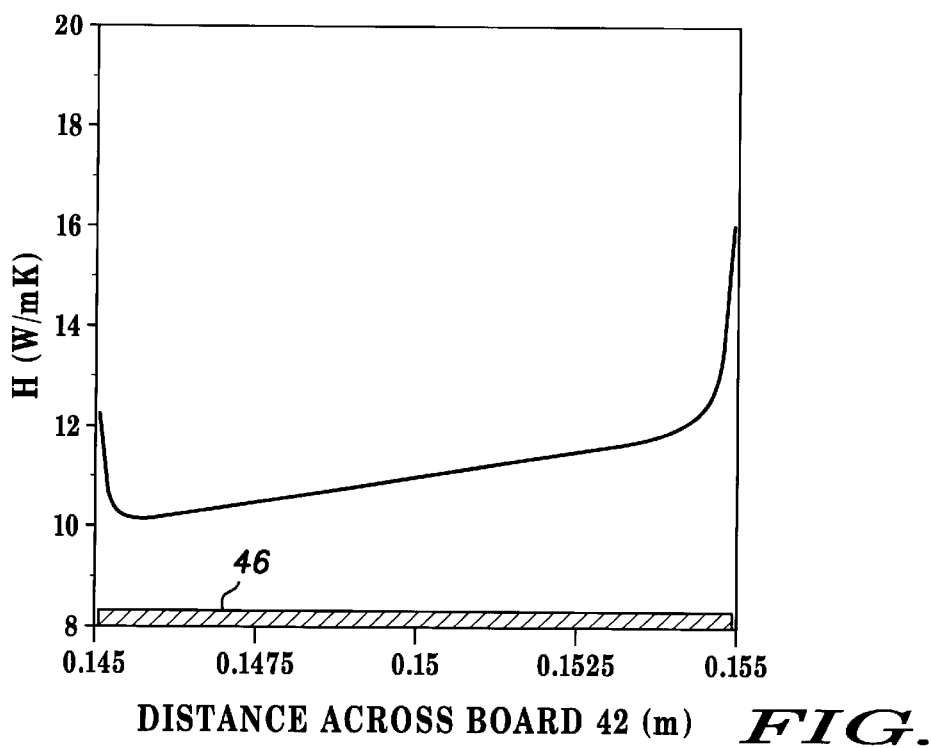
FIG. 16 is a graph representing the variation in the time-averaged heat transfer coefficient existing along a top face of the single microchip device of FIG. 14 when it is cooled using the new unsteady impinging jet system according to the present invention.

Due to the sweeping motion of the tip of the jet 40, the proportion of time at which low-temperature coolant impinges hot microchip devices is increased using the new system and the "sweeping" motion reduces temperatures significantly. As shown in FIG. 16, the sweeping motion of the tip of the jet 40 across the microchip device 46 leads to heat transfer coefficients all along the top face of the microchip device that are larger than those of the conventional systems as shown in FIGS. 3, 7 and 11. This is true even along the sides or lateral faces of the microchip device, at which cooling can be especially difficult. The heat transfer coefficients shown in FIG. 16 are approximately the same as those of the channel-flow system in FIG. 3 despite the channel-flow system's much greater pumping power (6.5 times larger for channel flow).

Figure 17:
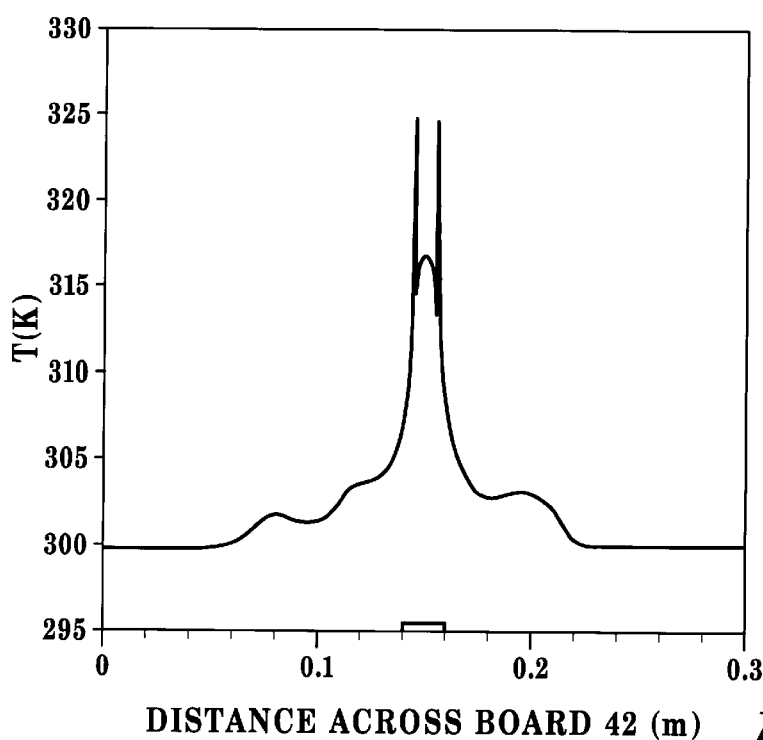
FIG. 17 is a graph representing the variation of the time-averaged temperature over the top face and edges of the single microchip device of FIG. 14 as well as the bottom circuit board supporting the microchip device when the circuit board is cooled using the new unsteady impinging jet system in accordance with the present invention.

Specifically in comparison with the prior art conventional channel-flow system of FIGS. 1–4, the heat transfer coefficients shown in FIG. 16 are more uniform across the microchip device 46 as can be seen from a comparison of FIG. 16 with FIG. 3. Further as shown in FIG. 17, the time-averaged temperatures on the top face of the microchip device 46 are lower than the temperatures experienced by microchip devices cooled via the conventional systems, and in particular the peak value of the time-averaged temperature is at least 5 degrees Celsius lower than the peak values for the conventional systems of FIGS. 1–12. This temperature difference could be larger where more power was being dissipated by the microchip device (e.g., 10 Watts).

Two additional benefits also result from the new unsteady jet system. As shown in FIG. 14, the jet 40 separates once it reaches the circuit board 42, and consequently the board rapidly reaches ambient temperature on both sides of the microchip device 46 as one progresses toward the exit sides of the channel formed between the baffle 44 and target circuit board 42. For example, microchip devices positioned at points 41 shown in FIG. 14 would be less likely to experience excessive temperatures than microchip devices positioned at points 21 in FIG. 6. Further, due to two recirculation zones on the sides of the jet 40, warm air is removed near the top of the channel formed between the baffle 44 and target circuit board 42, near the baffle at locations 50 in FIG. 14. Hence, the thermal wake impacting negatively downstream components on either side of the microchip device 46 does not occur and locations 43 near the exit sides of the channel are cool.

Figure 20:
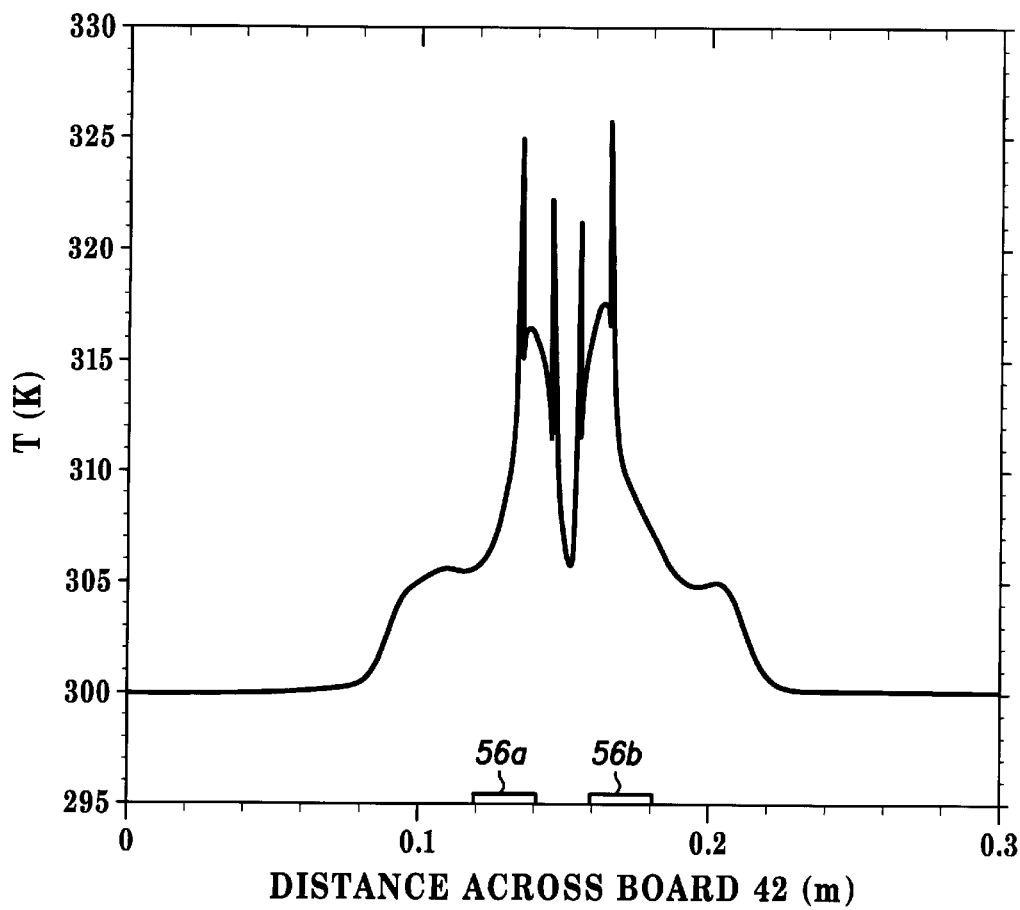
FIG. 20 is a graph of the variation of the time-averaged temperature over the top faces of the two microchip devices of FIG. 18 (and the portion of the circuit board on which the microchip devices are mounted that is in between and around the two microchip devices), during cooling by way of the new unsteady impinging jet system in accordance with the present invention.

Turning to FIGS. 18–20, another embodiment of the present invention, shown in FIG. 13, can also be employed to cool two microchip devices 56a,56b positioned 1 centimeter apart on the target circuit board 42 opposite either end of the 1-centimeter rectangular slot that forms the opening 38. In alternate embodiments, greater than two microchip devices can also be cooled. As shown in FIGS. 19–20, even when cooling two microchip devices 56a,56b using the same jet 40 generated with the same amount of pumping power, the new system continues to provide greater cooling of the devices than occurs with the conventional systems. As shown in FIG. 19, the heat transfer coefficients experienced by the two devices 56a,56b are higher than for the conventional systems, and the distributions of the heat temperature coefficients of the two devices are approximately symmetrical. The time-averaged temperatures over the top faces of the two microchip devices are also lower than those obtained using the conventional systems. Even when the jet 40 does not directly impinge on the components, but only impinges proximate the components, the jet 40 still provides effective cooling. In contrast to the conventional system employing two steady jets 28a,28b, the region between the two microchip devices 56a,56b also is cooled.

Figure 21:
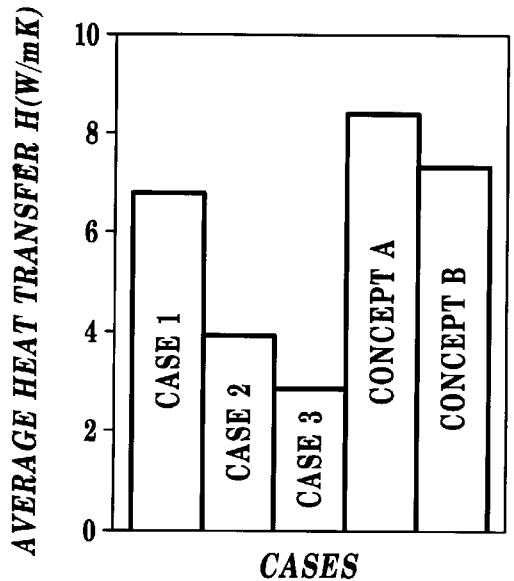
FIG. 21 is a bar graph comparing the respective time and chip face average heat transfer coefficients obtained using each of the systems of FIGS. 1–20.
Figure 22:
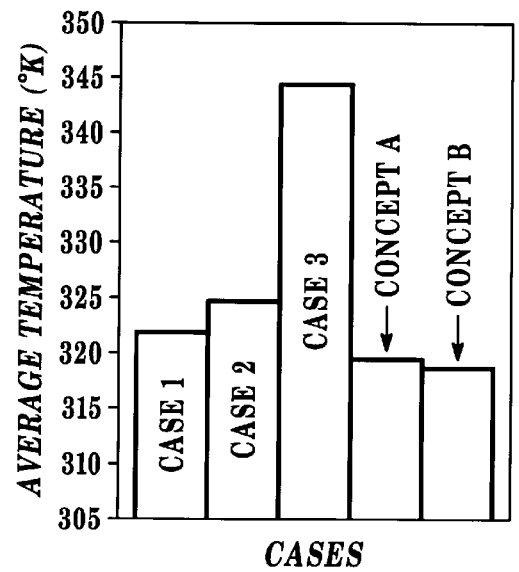
FIG. 22 is a bar graph comparing the respective time and chip face averaged temperatures on the top faces of microchip devices cooled using each of the five systems of FIGS. 1–20.

Turning to FIGS. 21–22, bar graphs are provided showing with greater clarity the difference in performance between the example of new system (used to cool either one microchip device or two microchip devices) and the conventional systems of FIGS. 1–12 in terms of, respectively, average heat transfer coefficients obtained over the top faces of the microchip devices being cooled and average temperatures over the top faces of the microchip devices. Temperature differences between the new system and the conventional systems would be even larger for higher pumping powers; however, as shown in FIG. 22, at conservative low power values (e.g., 1 W), the difference between the new system and the conventional systems is already significant. In FIGS. 21 and 22, Case 1 (channel flow) has a pumping power 6.5 times larger than all other cases. However, even with a 6.5 times lower power, the new system of FIGS. 13–20 (shown as Cases 4 and 5) provides lower peak temperatures compared to Case 1. Further, the new system also provides much lower temperatures compared to Cases 2 and 3 (steady jet systems).

By now it should be appreciated that a novel cooling system is achieved. A jet of a fluid that is directed from an opening towards a target along a first axis can be made to oscillate or buckle about that first axis, and to further oscillate or sweep across the target, such that the jet impacts and thereby cools a variety of locations on the target with greater efficiency than previous cooling methods or apparatus. The present inventors have further discovered that the oscillation in the jet can be-caused by setting the distance between the opening and the target to within a particular range of distances and setting the Reynolds number of the jet to within a particular range of values such that the jet is operating in an unsteady laminar mode in between the normal steady laminar and turbulent modes of flow. The novelty of the present invention stems in part from the inventors' focusing on the unsteady laminar mode of flow, which is only a transitional mode in between the normal steady laminar and turbulent modes.

While the foregoing specification illustrates and describes the preferred embodiments of this invention, it is to be understood that the invention is not limited to the precise construction herein disclosed. The invention can be embodied in other specific forms without departing from the spirit or essential attributes. As mentioned, while the specific embodiments discussed above are designed for cooling microchip devices, the invention can also be employed to cool (or heat) a wide variety of other devices that require such cooling (or heating). Accordingly, reference should be made to the following claims, rather than to the foregoing specification, as indicating the scope of the invention.

What is claimed is:

1. A system for cooling comprising:
   an opening forming a plane through which a jet of a coolant can flow;
   a pumping device behind the opening forcing the jet through the opening; and a target element positioned in front of the opening at a predetermined distance from the plane of the opening so that the jet is directed toward the target element, wherein a predetermined size of the opening in combination with the predetermined distance cause the jet to oscillate such that a tip of the jet sweeps across the target element.

2. The system of claim 1, wherein the size and the distance are predetermined according to known characteristics of the coolant and a known velocity for which the pumping device will force the coolant through the opening.

3. The system of claim 2 wherein a linear relationship is maintained between the distance and a Reynolds number.

4. The system of claim 1, wherein the target element is a circuit board having a first surface facing the incoming jet of coolant, and further having a first microchip device coupled to the first surface in front of the opening.

5. The system of claim 4, wherein the opening is formed within a baffle that is positioned parallel to the circuit board.

6. The system of claim 5, wherein a channel is formed between the baffle and the circuit board, and wherein recirculation zones occur on two sides of the jet and consequently coolant that has been warmed collects near, and exits the channel along, the circuit board.

7. The system of claim 1, wherein the target element is a circuit board having a first surface facing the incoming jet of coolant, and further having a pair of microchip devices coupled to the first surface in front of the opening, wherein a first of the microchip devices is coupled in front of a first end of the opening and a second of the microchip devices is coupled in front of a second end of the opening.

8. The system of claim 1, wherein the coolant is one of a gas and a liquid.

9. The system of claim 8, wherein the coolant is air.

10. A system for cooling comprising:

an opening forming a plane through which a jet of coolant can flow;

a pumping device positioned behind the opening which forces a coolant to flow out of the opening in a jet; and a target element positioned in front of the opening so that the jet is directed toward the target element wherein a distance between the opening and the target element along a first axis is within a first range of distances and a Reynolds number associated with the jet is within a second range of values so that the jet flows in an unsteady laminar manner wherein the jet of coolant varies in its position relative to the first axis at different points along the first axis and the portion of the target element being struck by a stagnation point of the jet of coolant varies in time.

11. The system of claim 10, wherein the coolant is air, the first range is between 5 and 7 centimeters, and the second range is between 570 and 630.

12. The system of claim 11, wherein the opening is a rectangular slot having a width dimension of 1 centimeter.

13. A system for causing a target element to experience a change in temperature, the system comprising:

an opening;

a jet creation means positioned behind the opening for generating and forcing a jet of material having a desired Reynolds number through the opening towards a target element;

a region between the target element and the opening wherein the jet moves with an oscillatory movement, wherein a tip of the jet oscillates with respect to the target element so that the jet impinges a variety of locations on the target element.

14. A method for cooling a target element comprising:

providing an opening forming a plane through which a jet of coolant can flow;

forcing the jet of coolant from the back of the opening through the opening; and providing a target element positioned in front of the opening at a predetermined distance form the plane of the opening so that the jet of coolant is directed toward the target element, wherein a predetermined size of the opening in combination with the predetermined distance cause the jet to oscillate such that a tip of the jet sweeps across the target element.

15. The method of claim 14, wherein the predetermined distance between the opening and the target element is along a first axis within a first range of distances and using a Reynolds number associated with the jet of coolant within a second range of values causing the jet of coolant to flow in an unsteady laminar manner wherein the jet of coolant varies in its position relative to the first axis at different points along the first axis and the portion of the target element being struck by a stagnation point of the jet of coolant varies in time.

16. The method of claim 15, including using the first range between 5 and 7 centimeters, and the second range between 570 and 630.

17. The method of claim 15, wherein providing the opening including using a rectangular slot having a width dimension of 1 centimeter.

18. The method of claim 15, wherein providing the target element includes using a first circuit board having a first surface facing the incoming jet of coolant, and further having a first microchip device coupled to the first surface in front of the opening.

19. The method of claim 15, wherein providing the target element includes using a circuit board having a first surface facing the incoming jet of coolant, and further having a pair of microchip devices coupled to the first surface in front of the opening, wherein a first of the microchip devices is coupled in front of a first end of the opening and a second of the microchip devices is coupled in front of a second end of the opening.

* * * * *